US012749944B2

(12) United States Patent
Khadilkar et al.

(10) Patent No.: US 12,749,944 B2
(45) Date of Patent: Sep. 29, 2026

(54) PERFORATED LOUVERS TO REDUCE NOISE LEAKAGE FROM A GENERATOR SET ENCLOSURE

(71) Applicant: Cummins Power Generation Inc., Minneapolis, MN (US)

(72) Inventors: Arti M Khadilkar, Pune (IN); Mayur K Patil, Pune (IN); Tejas Kalkundrikar, Pune (IN)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 19/061,757

(22) Filed: Feb. 24, 2025

(65) Prior Publication Data

US 2026/0254312 A1 Aug. 27, 2026

(51) Int. Cl.

*H02K 5/24* (2006.01)
*F01P 5/02* (2006.01)
*H02K 7/18* (2006.01)

(52) U.S. Cl.

CPC .................. *H02K 5/24* (2013.01); *F01P 5/02* (2013.01); *H02K 7/1815* (2013.01)

(58) Field of Classification Search

CPC ............ H02K 5/24; H02K 7/1815; F01P 5/02
See application file for complete search history.

(56) References Cited

U.S. PATENT DOCUMENTS

| | | | | |
|---|---|---|---|---|
| 2,051,613 | A * | 8/1936 | Macleod | F24F 7/013 454/206 |
| 4,116,269 | A | 9/1978 | Ikeda | |
| 4,335,797 | A | 6/1982 | Simmons | |
| 8,672,089 | B2 | 3/2014 | Kelly et al. | |
| 11,411,459 | B2 | 8/2022 | More | |
| 2018/0354712 | A1* | 12/2018 | Goleczka | B65D 88/74 |
| 2022/0366887 | A1 | 11/2022 | Gerdes et al. | |

FOREIGN PATENT DOCUMENTS

| | | | |
|---|---|---|---|
| CN | 211370175 | U | 8/2020 |
| CN | 111795012 | A | 10/2020 |
| CN | 213654986 | U | 7/2021 |

OTHER PUBLICATIONS

AL-450W Acoustic Louvre by Ventuer—EBOSS.
Alibaba, "Decorative Acoustic Louvers Aluminum Noise Reduction Louvers" retrieved from https://www.alibaba.com/product-detail/Decorative-acoustic-louvers-aluminum-noise-reduction_1600429451608.html.

* cited by examiner

*Primary Examiner* — Sean Gugger
(74) *Attorney, Agent, or Firm* — Foley & Lardner LLP

(57) ABSTRACT

A genset includes a generator, an enclosure, and a plurality of louvers. The enclosure defines a space that is at least partially enclosed, with the generator in the space. The louvers extend from the enclosure inward to the enclosed space. Each of the louvers include a short leg and a long leg, the long leg coupled with the short leg at an angle to the short leg.

20 Claims, 5 Drawing Sheets

PERFORATED LOUVERS TO REDUCE NOISE LEAKAGE FROM A GENERATOR SET ENCLOSURE

TECHNICAL FIELD

The present disclosure relates generally to enclosures for housing electric machines.

BACKGROUND

Generator sets (also known as "gensets") may be employed for physical power production in a variety of applications. A genset typically includes an engine and an electric power generator coupled to the engine. The engine is structured to mechanically drive the generator which, in turn, can produce electricity. The engine and the generator may be housed within an enclosure that allows the genset to operate outdoors.

SUMMARY

In some embodiments, a genset includes a generator, an enclosure, and a plurality of louvers. The enclosure defines a space that is at least partially enclosed, the generator in the space. The louvers extend from the enclosure inward to the enclosed space. Each of the louvers include a short leg and a long leg, the short leg extending from the long leg at an angle to the long leg.

In some embodiments, each louver further includes a fastener to detachably couple the short leg to the long leg. In some implementations, the position of the fastener is adjustable such that the angle between the short leg and the long leg can vary within a range between approximately 60° and 120°. Further, the fastener can be removed such that the short leg and the long leg are decoupled from each other to adjust a value of the genset.

In some embodiments, the louver further includes one or more acoustic linings configured to absorb noise produced by the genset. In some implementations, each of the linings may vary in a thickness within a range between approximately 10 millimeters and 100 millimeters.

In some embodiments, the shorts leg and the long leg of the louver are structured such that a ratio between a length of the short leg to a length of the long leg may vary within a range between approximately 0.3:1 and 0.8:1.

In some embodiments, the short leg and the long leg of the louver are integrally formed. In some implementations, the integral louver does not require a fastener and is a single component.

In some embodiments, a first end of the long leg is coupled with an inner surface of the enclosure and a first end of the short leg extends from a second end of the long leg.

In some embodiments, an enclosure for a genset includes a housing defining an at least partially enclosed space, a plurality of openings formed on at least one side of the housing, and a plurality of louvers coupled to the at least one side of the housing. Each of the louvers of the plurality of louvers including a first leg and a second leg, with the second leg coupled to the first leg at an angle to the first leg.

In some embodiments, the louvers are attached to a side of the housing, extending from the enclosure at an upwards angle into the enclosed space and defining the plurality of openings. In some implementations, the louvers include an acoustic lining to absorb noise.

In some embodiments, the short leg and the long leg of the louver are structured such that a ratio between a length of the first leg to a length of the second leg may vary within a range between 1:2 and 3:4.

In some embodiments, an airflow system for a genset includes an enclosure, a fan, and a plurality of louvers arranged in a louver assembly and coupled to the enclosure. The fan is configured to drive air into the enclosure. The plurality of louvers is assembled such that each of the louvers structured to form a first path and a second path. The first path is a path for air driven by the fan to be directed into the enclosure. The second path is a path for sound to be directed from inside the enclosure along the louver assembly in multiple directions, out of the enclosure. Each of the first path and the second path are structured to restrict direct movement into and out of the enclosure.

In some embodiments, one side of a leg of one of the louvers is configured to reflect sound while an other side of the leg includes a sound absorptive material, while a different leg of the louver includes two sides each including a sound-absorptive material.

In some embodiments, the plurality of louvers is structured such that a first louver above a second louver overlaps the second louver so as to prevent direct flow into and out of the enclosure.

In some embodiments, a side of each of the plurality of louvers facing the second path includes a sound-absorptive material.

It should be appreciated that all combination of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
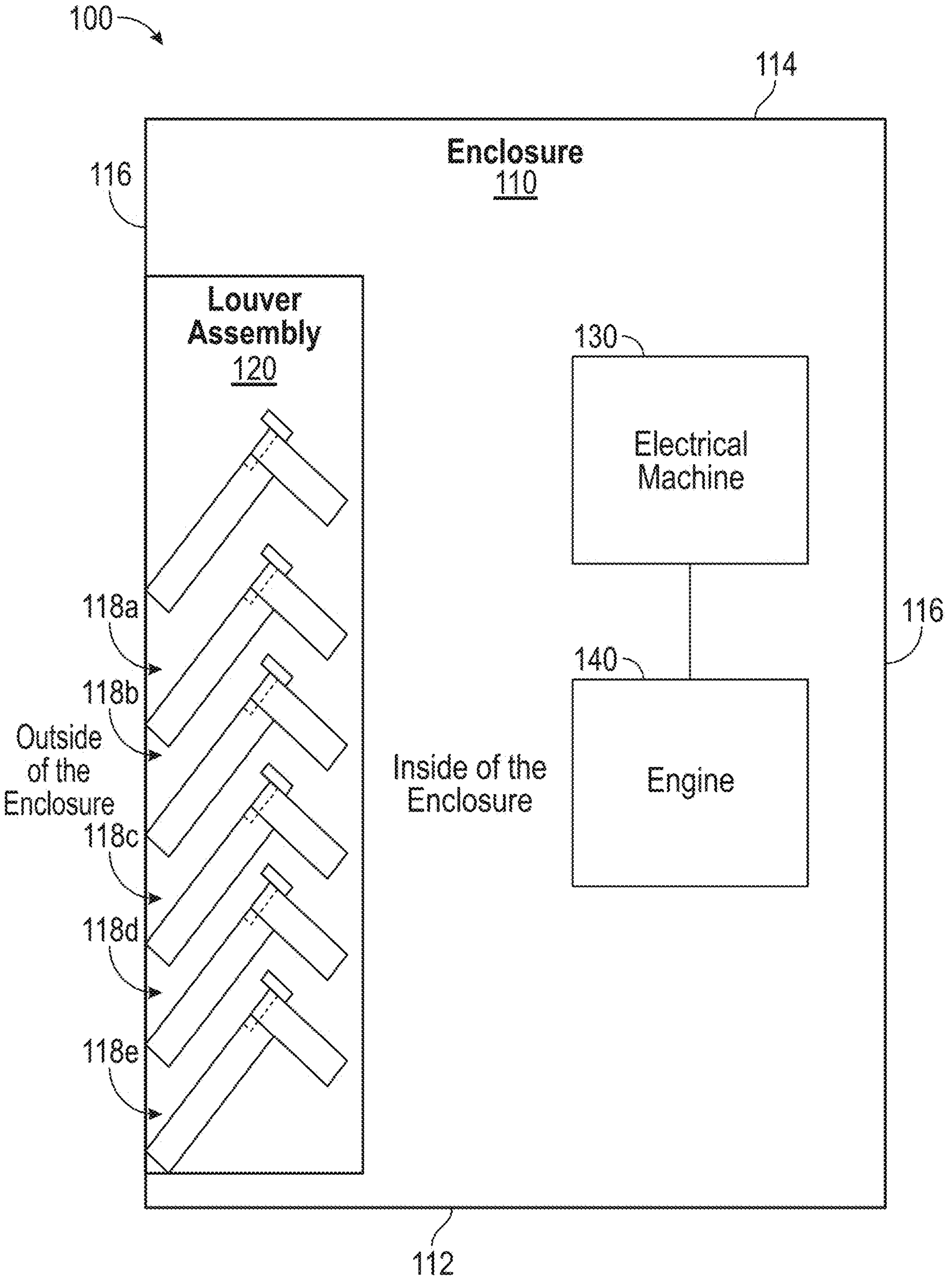
FIG. 1 is a block diagram of a genset, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and devices for suppressing acoustic noise generated as a result of ventilation air entering and exiting an enclosure (e.g., a genset enclosure). In particular, embodiments described herein relate generally to a louver assembly including a plurality of louvers coupled to a ventilation air opening of the enclosure. One or more louvers of the louver assembly can redirect noise in the air multiple times, toward at least one acoustic lining disposed along the louver. The acoustic lining can absorb and reduce the noise that is redirected by the louver. Each of the louvers of the louver assembly defines a flow path, which may be adjusted to optimize air movement and noise reduction within the enclosure. For example, enclosures can be useful to allow components in the enclosure to tolerate varied and/or extreme environmental conditions of temperature, humidity, precipitation, for example and without limitation; the louver assembly can allow for more effective airflow and/or noise management including under such conditions.

In some embodiments, one or more louvers includes a long and a short leg. The louver can include a fastener configured to detachably couple the short leg to the long leg. The louvers can allow for effective utilization of the acoustic lining, which absorbs sound energy before it can escape the enclosure. The louvers can allow for sound energy to have multiple reflections such that the sound energy can be effectively absorbed by the acoustic lining.

Enclosures for gensets typically include openings to facilitate the exchange of ventilation air between the interior of the enclosure and the environment surrounding the enclosure, which cools internal components during operation. However, the openings also provide a path through which sound from the engine and other components can exit the enclosure. For this reason, enclosures for gensets often include noise suppression devices (e.g., parallel baffle silencers, attenuators, etc.) in the cooling air intake and discharge paths, which may attenuate noise by passing the cooling air through a series of parallel baffles. Louvers in accordance with the present can allow for less bulky and less restrictive (e.g., to air flow along the flow path through the enclosure) noise suppression, such as to perform noise reduction themselves and/or reduce or eliminate the need for separate noise suppression devices.

FIG. 1 is a schematic block diagram of a genset 100, according to an embodiment. The genset 100 includes an enclosure 110, a louver assembly 120 (e.g., a plurality of louvers 200), and a generator, shown as electrical machine 130. The genset 100 can include an engine 140 coupled with the electrical machine 130. The enclosure 110 defines an at least partially enclosed space. The enclosure 110 can be a housing for components of the genset 100 such as the electrical machine 130. In some embodiments, a different number of louver assemblies can be included.

The engine 140 can be a diesel engine, a gasoline engine, a natural gas engine, a dual fuel engine, a biodiesel engine, an E85 engine, a flex fuel engine, a gas turbine, a hybrid engine, an electric engine, a hydrogen engine, or another type of internal combustion engine or driver. In various embodiments, the engine 140 can be a high horsepower (HHP) engine capable of providing power in the range of 500 hp to 4,500 hp or more. The electrical machine 130 can be an electric power generator, an alternator, or the like. In one embodiment, the engine 140 is coupled to the electrical machine 130 by, for example, a driveshaft (not shown). In operation, the engine 140 drives the electrical machine 130 to produce electricity (e.g., power). Embodiments of the present disclosure are also applicable for various types of prime movers (mechanical, electrical, hydro, and/or fuel cell types) with various power strengths (low, medium, and high horsepower).

The enclosure 110 includes end walls (e.g., container walls, sidewalls, etc.) at least partially defining an internal volume for housing the louver assembly 120, the electrical machine 130, the engine 140 and other genset components. For example, the end walls can include an enclosure floor 112, an enclosure roof 114, and a pair of container sidewalls 116 arranged in substantially perpendicular orientation relative to the enclosure floor 112 and the enclosure roof 114. The enclosure floor 112 and the enclosure roof 114 are coupled at their lateral edges to edges of the container sidewalls 116. One or more doors can be provided in one or more of the container end walls to allow an operator of the genset 100 (e.g., maintenance or repair personnel) to enter the internal volume defined by the enclosure 110 and access the genset 100. The enclosure 110 can include a pair of enclosure end walls positioned at ends of the enclosure 110 and coupled to corresponding edges of the enclosure floor 112, the enclosure roof 114, and the pair of container sidewalls 116 so as to seal the enclosure 110 from the surrounding environment. One or more ventilation openings, shown as ventilation openings **118*a*-118*e* can be provided in any number of the container sidewalls 116 of the enclosure 110 to allow the flow of both air and sound into and out of the enclosure 110. In some embodiments, the louver assembly 120 can be positioned at the ventilation openings 118*a*-118*e* of the enclosure 110. In some embodiments, the louver assembly 120 can be positioned anywhere along the end walls of the enclosure 110. The end walls of the enclosure 110 can be formed from any suitable material, for example, corrugated weathering steel. Furthermore, the enclosure 110 can have the dimensions of a standard ISO container (e.g., a length of about 6.1 meters, 12.2 meters, 14.6 meters or about 16.2 meters and a height of about 2.59 meters, 2.9 meters, or about 3.2 meters). In some embodiments, the enclosure 110 can include a non-ISO container, for example, any non-standard sized ISO container. The enclosure 110** can be formed from flat sheet metal, die-stamped sheet metal or a non-metallic material (e.g., wood, plastics, reinforces polymers, cement, concrete, fiber glass, carbon fiber, etc.).

In some embodiments, the enclosure 110 can be disposed on the ground. In some embodiments, the enclosure 110 can be mounted on a fuel tank (not shown) that is disposed on the ground, or mounted on skids (not shown) that are disposed on the ground. In some embodiments, the enclosure 110 can be positioned on a rooftop above the ground or another suitable location.

The enclosure 110 is configured to allow for air to flow into and/or through the enclosure 110. For example, such air flow can cool the genset 100 and/or provide intake air for the engine 140 of the genset 100. The one or more ventilation openings defined in the enclosure 110 can fluidly couple the internal volume of the enclosure 110 with an environment surrounding the enclosure 110.

Figure 2:
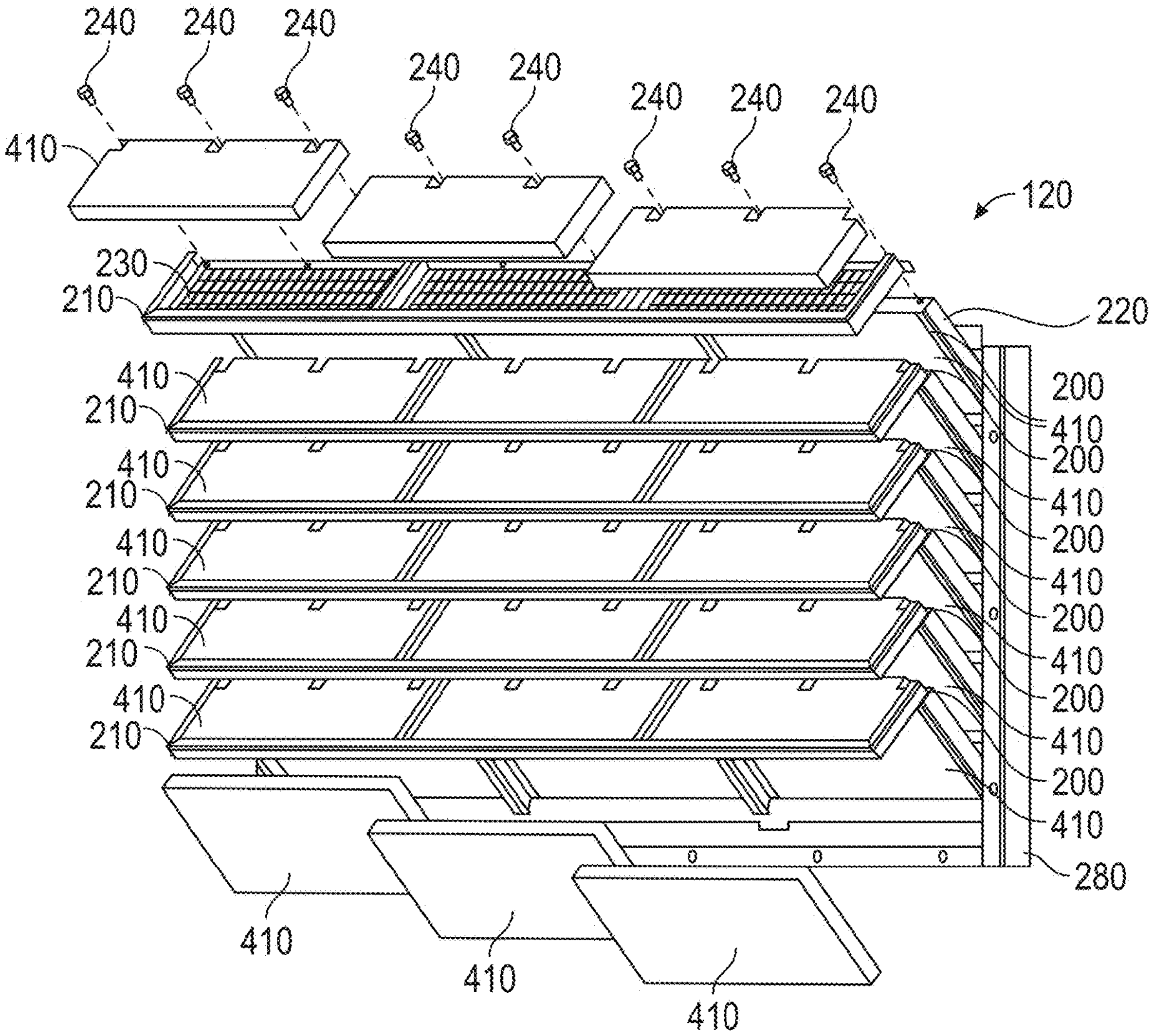
FIG. 2 is a perspective view of a louver assembly of the genset of FIG. 1.

As shown in FIG. 2, the louver assembly 120 includes a plurality of louvers 200. In some embodiments, the louver assembly 120 can include any number of the louver 200. In some embodiments, the louver assembly 120 includes a frame 280 configured to couple the louver assembly 120 with the enclosure 110. In some embodiments, each louver 200 is directly attached to an inner surface of at least one side of the enclosure 110. In this manner, the louver assembly 120 can be an inlet and/or outlet fluidly coupling the internal volume of the enclosure 110 with the environment surrounding the enclosure. Each louver 200 of the louver assembly 120 is positioned such that upon being coupled to the enclosure 110, each louver 200 is positioned between a first opening (e.g., 118*a* of FIG. 1) and a second opening (e.g., 118*b* of FIG. 1). That is, each louver 200 is attached to at least one side of the housing between a corresponding first opening of the plurality of openings. In this manner, the louver assembly 120 creates a plurality of ventilation openings 118*a*-118*e* when it is coupled to the enclosure 110. For example, the louver assembly 120 shown in FIG. 2 includes six of the louver 200. Each louver 200 defines a first ventilation opening 118*a* above the louver 200 and a second ventilation opening 118*b* below the louver 200. This configuration allows for flow above and below each louver 200 between the enclosure 110 and the environment surrounding the enclosure 110.

Each louver 200 can include a first (e.g., short) leg 210 and a second (e.g., long) leg 220. The louver 200 can include a fastener 240, shown as a bolt, to couple the first leg 210 with the second leg 220. That is, each louver 200 can include a fastener such that the first leg 210 and the second leg 220 are detachably coupled. In some embodiments, the second leg 220 includes a first end and a second end, and the first leg 210 includes a first end and a second end. In some embodiments, the first leg 210 extends from the second leg 220 such that the first end of the first leg 210 extends from the second end of the second leg 220 towards the second end of the first leg 210.

In some embodiments, the second leg 220 is coupled with the inner surface of at least one side of the enclosure 110, with the first leg 210 coupled with the second leg 220. That is, the first end of the second leg 220 is coupled with an inner surface of the enclosure 110 and the first end of the first leg 210 extends from the second end of the second leg 220.

In some embodiments, the first leg 210 and the second leg 220 can be made from a metal such as carbon steel, aluminum, etc. In some embodiments, the first leg 210 and the second leg 220 can be made from any rigid material or combination of materials.

In various embodiments, the first leg 210 can be lined with a lining 230. The lining 230 can be perforated, e.g., having a series of holes so as to increase the surface area contacting the noise and break up and disperse sound waves of the noise. The lining 230 can be an acoustic lining, such as to be structured to absorb and attenuate noise (e.g., sound, sound energy, etc.) produced by the genset 100. That is, the first leg 210 includes the perforated lining 230 such that the first leg 210 absorbs sound energy. The noise can be generated by internal components of the genset 100 such as the electrical machine 130, the engine 140, or the like. Alternatively or in combination, the noise can be produced as a result of air flow passing through the enclosure 110.

In some embodiments, the second leg 220 is mechanically coupled to the first leg 210 via the fastener 240. In this configuration, the second leg 220 can be selectively removed from the first leg 210 to achieve at least one of a target temperature of the genset 100 by improving a loss coefficient, a target value of airflow entering the enclosure 110 by improving the loss coefficient and/or any other operating value desired by an operator of genset 100. For example, upon removal of the first leg 210 from the second leg 220, air entering the enclosure 110 has a more direct path into the enclosure 110 due to no first leg 210 causing redirection. As a result of the more direct path, incoming air can have a higher velocity and experience less friction, resulting in an improved loss coefficient and higher value of airflow entering the enclosure 110.

Figure 3:
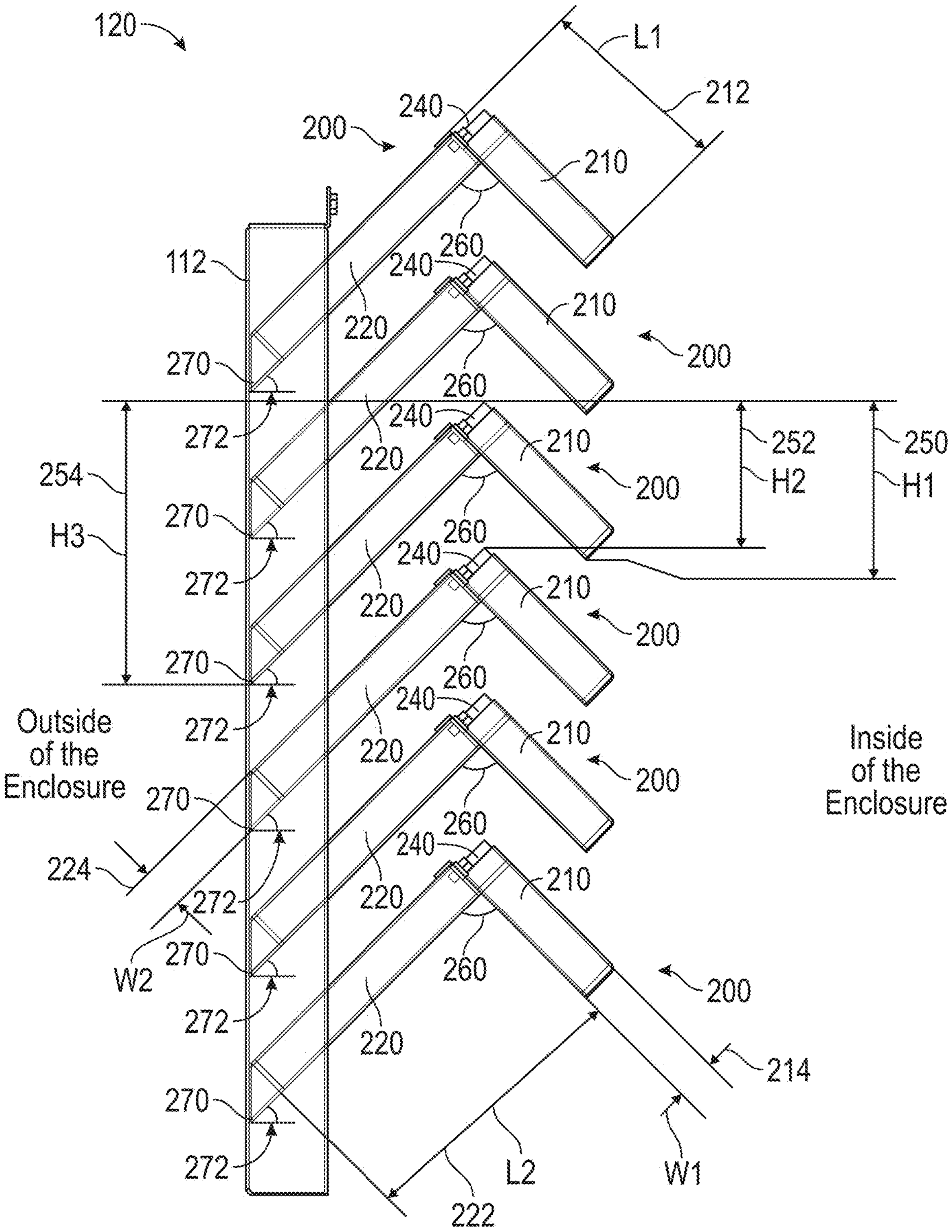
FIG. 3 is a side perspective view of the louver assembly of the genset of FIG. 1.

FIG. 3 is a side view of the louver assembly 120, according to an embodiment. As shown in FIG. 3, each louver 200 is coupled to the frame 280 such that the louver 200 extends from the enclosure 110 into the internal volume of the enclosure 110 at an extension angle 270, defined between (1) a horizontal reference plane 272 that is substantially parallel to the enclosure floor 112 and the enclosure roof 114, and (2) a bottom surface of the louver 200. In some embodiments, the louver 200 is coupled to the frame 280 such that the extension angle 270 is substantially upward (i.e., vertical) to the horizontal reference plane 272.

As shown in FIG. 3, the fastener 240 couples the first leg 210 with the second leg 220 such that the second leg 220 is coupled to the first leg 210 at a louver angle 260. The fastener 240 couples the first leg 210 with the second leg 220 such that the louver angle 260 is selectively adjustable between a range of values in order to achieve at least one of a target pressure drop value regarding a pressure of air entering the enclosure 110, a target temperature of the genset 100, or a target output noise level of the genset 100. For example, the fastener may be movable to allow for adjustment of the louver angle 260 between the first leg 210 and the second leg 220 to achieve a target pressure drop value along the louver 200. In this manner, the position of the fastener 240 at least partially determines the louver angle 260 created by the position of the second leg 220 relative to the first leg 210.

In some embodiments, the first leg 210 may be removably coupled with the second leg 220 to allow for adjustment of the noise level of the genset 100 to the target output noise level of the genset 100 and adjustment of the temperature of the genset 100 to the target temperature of the genset 100.

In some embodiments, the louver angle 260 is adjustable between a range of values up to and including 60° and 120°. That is, the first leg 210 and the second leg 220 are coupled such that the louver angle 260 is greater than or equal to 60° and less than or equal to 120°. For example, upon determining that the pressure drop value of air entering the enclosure is too high, an operator of the genset 100 can reposition (i.e., loosen) the fastener 240 in order to decrease the redirection of the air entering the enclosure, and thus increase the pressure of the air entering the enclosure 110. As the louver angle 260 increases, the restriction of flow decreases, meaning a louver 200 positioned at a relatively high angle (e.g., 120°), will allow more airflow and absorb/attenuate less noise than a louver 200 positioned at a relatively low angle (e.g., 60°). In some embodiments, when the fastener 240 is in a fully tightened position, the louver angle 260 is 90°.

In some embodiments, the louver angle 260 of each louver 200 of the louver assembly 120 is the same. In these embodiments, assuming a uniform air volume entering the enclosure 110, the pressure drop caused by, the amount of airflow received at, and the amount of noise absorbed and/or attenuated at each louver 200 will be substantially uniform.

In some embodiments, the louver angle 260 of one louver 200 is different than the louver angle 260 of another louver 200. In this manner, a first louver 200 can have the louver angle 260 of 90°, while a second louver 200 has the louver angle 260 of 100°. Advantageously, this variation in angle can allow for selective modification of performance of each louver 200 to achieve desirable effects such as a target volume of airflow, a target pressure drop, a target temperature of the genset 100, a target noise output level, and the like. For example, assuming uniform airflow entering the enclosure 110, air received at the first louver 200 will be more restricted than air received at the second louver 200 due to the difference in the louver angle 260. In this example, the pressure drop for the air received at the first louver 200 will be higher than that of the air received at the second louver 200. Further, noise exiting the enclosure 110 will be better absorbed by the first louver 200 than the second louver 200 due to the louver angle 260 of the first louver 200 causing more reflections towards lined surfaces of the louver assembly 120.

The first leg 210 has a length, L1 212 and a width, W1 214. The second leg 220 has a length, L2 222 and a width, W2 224. In some embodiments, the first leg 210 and the second leg 220 are structured such that a ratio of L1 212 to L2 222 is any value between and including 0.3:1 to 0.8:1. That is, the ratio of the L1 212 of the first leg 210 to the L2 222 of the second leg 220 is greater than or equal to 0.3:1 and less than or equal to 0.8:1. In some embodiments the ratio of L1 212 to L2 222 is any value wherein L2 222 is greater than L1 212. In this manner, L1 212 is substantially less than L2 222, meaning that the second leg 220 is substantially longer than the first leg 210.

As shown in FIG. 3, the position of each louver 200 of the louver assembly 120 can be structured based on one or more vertical lengths. A first vertical length, H1 250, is a vertical length between a highest point of the first leg 210 of a first louver 200. A second vertical length, H2 252, is a vertical length between the highest point of the first louver 200 and a highest point of a second louver 200, wherein the second louver 200 is positioned below the first louver 200. A third vertical length, H3 254, is a vertical length between the highest point of the first louver 200 and the lowest point of the first louver 200. In some embodiments, H1 250 is greater than H2 252 and less than H3 254. In this manner, direct (i.e., unrestricted) flow into and out of the enclosure 110 is restricted, meaning air or sound flowing across the louver assembly 120 will contact each louver 200 and be at least partially redirected and/or absorbed. This redirection and absorption is further described in respect to FIG. 5.

Figure 4:
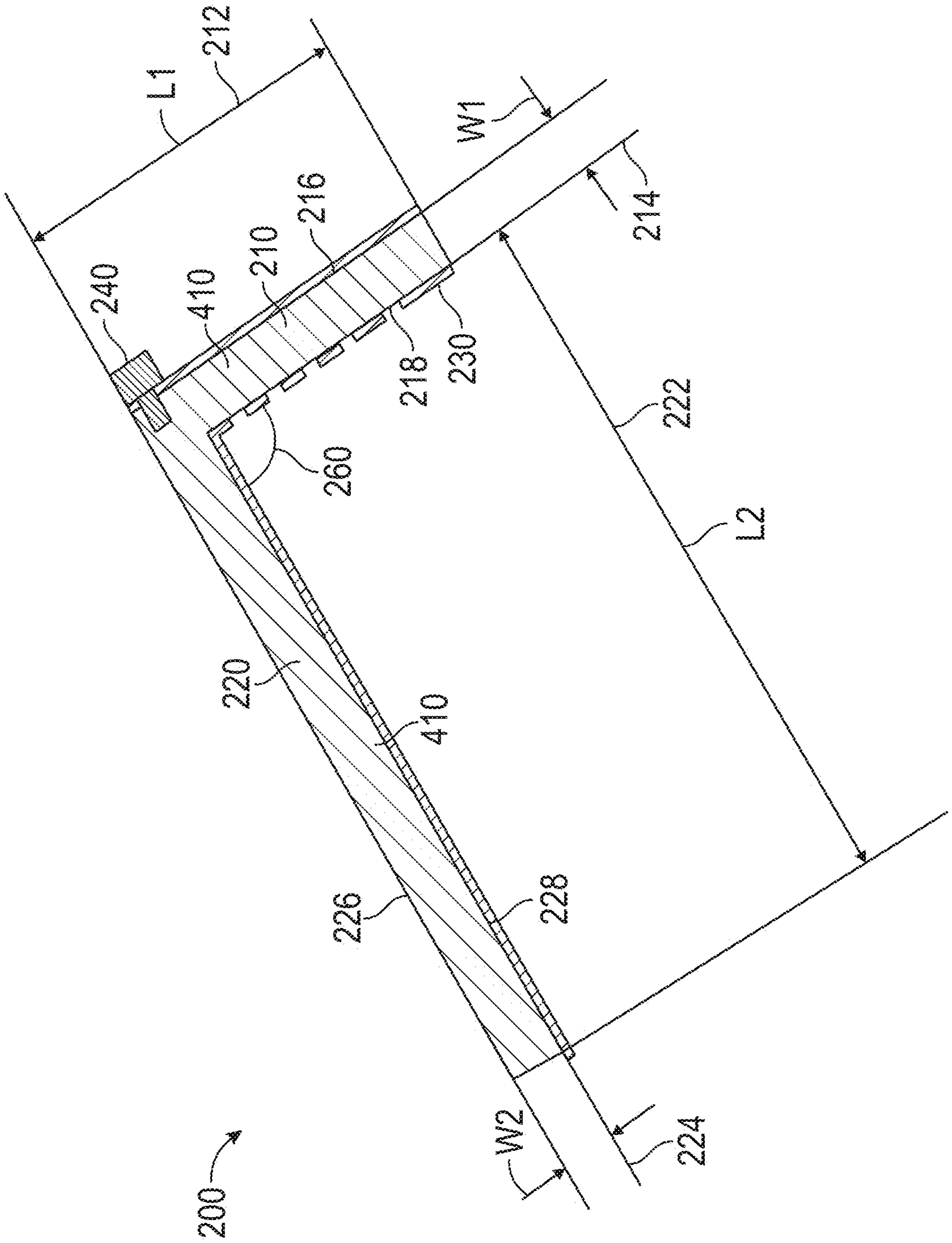
FIG. 4 is a perspective view of a louver of the genset of FIG. 1.

FIG. 4 is a perspective view of the louver 200, according to an embodiment. As shown in FIG. 4, the first leg 210 includes a bottom face 218 and a top face 216. The bottom face 218 of the first leg 210 is coupled to the lining 230 described with reference to FIG. 2. The second leg 220 includes a bottom face 228 and a top face 226. As shown, the first leg 210 and the second leg 220 include an acoustic lining 410. The acoustic lining 410 is specifically formulated to absorb and reduce the noise that is redirected by each louver 200 of the louver assembly 120. That is, the bottom face 228 of the second leg 220 includes the acoustic lining 410, such that the bottom face 228 absorbs sound energy.

In some embodiments, each louver 200 includes the acoustic lining 410 on the first leg 210 and/or the second leg 220, such that each louver 200 absorbs sound energy.

In some embodiments, the acoustic lining 410 is an acoustic damping material such as polyurethane foam, melamine foam, or the like, with a thickness between and including 10 millimeters to 100 millimeters. In some embodiments, the acoustic lining 410 can have any other thickness. In some embodiments, the acoustic lining 410 is substantially uniform in thickness, providing substantially similar absorption qualities throughout its volume. In some embodiments, the acoustic lining 410 varies in thickness throughout its volume. In various embodiments, the acoustic lining 410 can be or include fibrous materials (e.g., rock wool, glass wool, mineral wool, etc.), non-fibrous materials (e.g., polyurethane foam, melamine foam, etc.), or the like.

In some embodiments, the acoustic lining 410 is mechanically connected (e.g., bonded with an adhesive product, coupled using magnets, etc.) to the louver 200. In some embodiments, the acoustic lining 410 completely lines the louver 200. In some embodiments, the acoustic lining 410 partially lines the louver 200.

In some embodiments, each of the first leg 210 and the second leg 220 are metallic panels (e.g., aluminum, carbon steel, etc.). In this manner, the louver 200 is reflective to sound energy (i.e., noise) and air. Therefore, without the inclusion of the lining 230 and the acoustic lining 410 the louver 200 would reflect air and noise without substantially absorbing noise. Advantageously, the reflection of sound and air contributes to the restriction of airflow and the absorption of sound energy.

As shown in FIG. 4, the top face 226 of the second leg 220 does not include a liner. In some embodiments, the top face 226 of the second leg 220 is exposed to the environment surrounding the enclosure 110. Advantageously, the exposure of the top face 226 of the second leg 220 to the environment surrounding the enclosure 110 prevents water ingress and promotes reflection of both air and sound energy by the louver 200. That is, the top face 226 of the second leg 220 reflects sound and the bottom face 228 of the second leg 220 includes the acoustic lining 410 to absorb sound, and the first leg 210 includes two sides each having a sound absorptive material (i.e., the lining 230 on the bottom face 218 and the acoustic lining 410 on the top face 216). This reflection of air and sound energy by each louver 200 contributes to the restriction of airflow and also the absorption of sound energy by reflecting sound energy towards another louver 200 which includes the acoustic lining 410. This flow is further described with reference to FIG. 5.

In some embodiments, the first leg 210 and the second leg 220 can be in opposite positions such that the first leg 210 is coupled to the enclosure 110 and extends at a substantially upward angle into the enclosure 110 while the second leg 220 is detachably coupled to first leg 210 at an angle. In this manner, the bottom face 218 of the first leg 210 includes the acoustic lining 410, with the top face 216 of the first leg 210 exposed to the environment surrounding the enclosure, and the bottom face 228 of the second leg 220 includes the lining 230 with the top face 226 of the second leg 220 including the acoustic lining 410.

In some embodiments and as shown in FIG. 4, the first leg 210 and the second leg 220 are integrally formed. In this manner, the louver 200 does not include the fastener 240 as the louver 200 is one component instead of two (e.g., the first leg 210 and the second leg 220) detachably coupled. That is, the louver 200 is one component including the first leg 210 and the second leg 220, an end of the first leg 210 extending from an end of the second leg 220.

Figure 5:
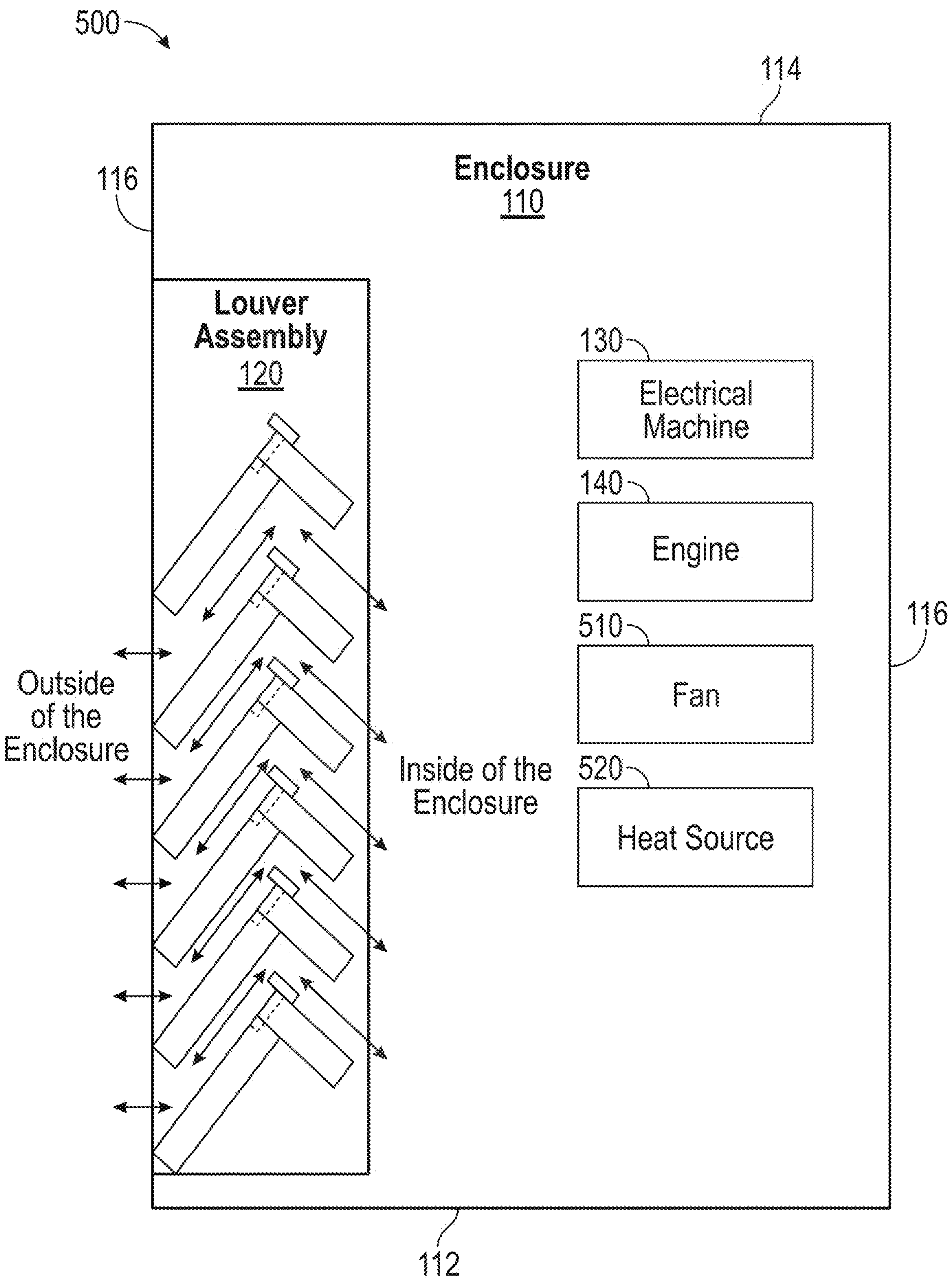
FIG. 5 is a block diagram of an airflow system for a genset, according to an embodiment.

Referring now to FIG. 5, a schematic block diagram of an airflow system 500 for the genset 100 is shown. The airflow system 500 includes the enclosure 110, the electrical machine 130, the engine 140, the louver assembly 120, a fan 510, and a heat source 520. The fan 510 is an air driver configured to drive air into the enclosure from the environment surrounding the enclosure 110 to cool at least one of the electrical machine 130, the engine 140, and/or any other component housed in the enclosure 110. In some embodiments, the fan 510 can be a plurality of fans positioned at different locations within the enclosure 110. In some embodiments, the fan 510 can be coupled to the engine 140 such that a speed of the fan 510 is proportional to a speed of the engine 140. In some embodiments, the fan 510 is driven separately from the engine 140 (e.g., via an electric fan motor, etc.).

The heat source 520 is a component contributing to an increase in temperature of any component housed in the enclosure 110. The heat source 520 can be or include any component of the engine 140, the electrical machine 130, and/or the enclosure 110 that experiences an increase in temperature during operation. In some embodiments, the heat source 520 includes a plurality of components contributing to the increase in temperature of any number of components housed in the enclosure 110.

As shown in FIG. 5, the louver assembly 120 defines a plurality of flow paths. Each flow path is defined by the louver angle 260 and the extension angle 270 in combination with the relationship between H1 250, H2 252, and H3, 254, as described with reference to FIG. 3. In some embodiments, a first path is the path in which air flows along a first louver 200 and a second louver 200 into the enclosure 110. As air enters the enclosure 110 across the louver assembly 120, it contacts the top face 226 of the second leg 220 of the second louver 200, and is reflected (e.g., redirected, etc.) toward the bottom face 228 of the second leg 220 of the first louver 200, which includes the acoustic lining 410. The bottom face 228 of the second leg 220 of the first louver 200 reflects the air substantially away from the bottom face 228 of the second leg 220 of the first louver 200. In some embodiments, the reflection from the bottom face 228 of the second leg 220 of the first louver 200 causes the air to flow towards the top face 226 of the second leg 220 of the second louver 200. In some embodiments, the reflection from the bottom face 228 of the second leg 220 of the first louver 200 causes the air to flow towards a bottom face 218 of the first leg 210 of the first louver 200. As air continues to flow into the enclosure 110, it can reflect any number of times in multiple directions between the first louver 200 and the second louver 200 before fully passing the louver assembly 120 and ultimately entering the enclosure 110.

In some embodiments, a second path is the path in which sound energy flows along the first louver 200 and the second louver 200 out of the enclosure 110. As described with reference to FIG. 3, the first leg 210 of the first louver 200 extends below the highest point of the second louver 200. This relationship restricts the flow of sound as it exits the enclosure 110. As noise flows outwards, it first contacts the first leg 210 of the first louver 200 and is reflected substantially downward toward the top face 216 of the first leg 210 of the second louver 200, which includes the acoustic lining 410. The sound energy is then reflected towards the bottom face 218 of the first leg 210 of the first louver 200, which includes the lining 230. As the sound energy continues to flow out of the enclosure 110, it can be reflected any number of times in multiple directions between the first louver 200 and the second louver 200 before fully passing the louver assembly 120 and ultimately exiting the enclosure 110. The reflections along the second path cause the noise energy to contact the acoustic lining 410 of the second leg 220 and the first leg 210 of the second louver 200 and the lining 230 of the first leg 210 of the first louver 200 any number of times, therefore promoting the absorption of sound energy and thereby, noise reduction. That is, a side of each of the plurality of louvers facing the second path includes a sound-absorptive material.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicated approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into subranges as discussed above. Finally, as will be understood by one skilled in the art, a range includes each individual member.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features describes and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members of the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes, and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A genset comprising:
- a generator;
- an enclosure defining a space that is at least partially enclosed, the generator in the space; and
- a plurality of louvers extending from the enclosure into the space, each louver of the plurality of louvers comprising:
  - a short leg; and
  - a long leg longer than the short leg, the short leg extending from the long leg at an angle to the long leg, and wherein a first end of the long leg is coupled to an inner surface of the enclosure and extending inwards relative to the enclosure and the short leg is coupled to a second end of the long leg inwards of the first end of the long leg and extending inwards relative to the enclosure.

2. The genset of claim 1, further comprising a fastener configured to detachably couple the short leg to the long leg.

3. The genset of claim 1, further comprising a fastener that couples the long leg of a given louver of the plurality of louvers with the short leg of the given louver to allow for adjustment of the angle to a target angle to achieve a target pressure drop value along the given louver.

4. The genset of claim 1, wherein the short leg extends from the long leg such that the angle is greater than or equal to 60 degrees and less than or equal to 120 degrees.

5. The genset of claim 1, wherein the short leg comprises a perforated acoustic lining such that the short leg absorbs sound energy.

6. The genset of claim 1, wherein the long leg comprises a bottom side, the bottom side of the long leg including an acoustic lining, such that the bottom side of the long leg absorbs sound energy.

7. The genset of claim 1, wherein the long leg and the short leg comprise an acoustic lining having a thickness greater than or equal to 10 millimeters and less than or equal to 100 millimeters.

8. The genset of claim 1, wherein the short leg and the long leg are sized such that a ratio of a length of the short leg to a length of the long leg is greater than or equal to 0.3:1 and less than or equal to 0.8:1.

9. The genset of claim 1, wherein the short leg is removably coupled with the long leg to allow for adjustment of at least one of a noise level associated with the genset to a target noise level or a temperature associated with the genset to a target temperature.

10. The genset of claim 1, wherein a first end of the long leg is coupled with an inner surface of the enclosure, and a first end of the short leg extends from a second end of the long leg.

11. The genset of claim 1, wherein the short leg and the long leg are integrally formed.

12. An enclosure for a genset, the enclosure comprising:
- a housing defining a space that is at least partially enclosed;
- a plurality of openings formed on at least one side of the housing; and
- a plurality of louvers coupled to the at least one side of the housing, each louver of the plurality of louvers comprising:
  - a first leg; and
  - a second leg longer than the first leg, the second leg coupled with the first leg at an angle to the first leg, and wherein a first end of the second leg is coupled to an inner surface of the enclosure and extending inwards relative to the enclosure and the first leg is coupled to a second end of the second leg inwards of the first end of the second leg and extending inwards relative to the enclosure.

13. The enclosure of claim 12, wherein each louver of the plurality of louvers is attached to the at least one side of the housing between a corresponding first opening of the plurality of openings.

14. The enclosure of claim 12, wherein each louver of the plurality of louvers includes an acoustic lining on at least one of the first leg or the second leg, such that each louver of the plurality of louvers absorb sound energy.

15. The enclosure of claim 12, wherein the louvers extend from the enclosure into the space at an upward angle to the at least one side of the enclosure.

16. The enclosure of claim 12, wherein a ratio of a length of the first leg to a length of the second leg is greater than or equal to 1:2 and less than or equal to 3:4.

17. An airflow system for a genset, the airflow system comprising:
- an enclosure;
- a fan configured to drive air into the enclosure; and
- a plurality of louvers coupled to the enclosure, arranged in a louver assembly such that each louver of the plurality of louvers is structured to form a first path for the air driven by the fan to be directed in to the enclosure, and a second path for sound to be directed, from inside the enclosure, along the louver assembly in multiple directions, out of the enclosure, wherein each of the first path and the second path further comprise defining a path which restricts direct movement into and out of the enclosure, wherein each louver includes a short leg coupled to a long leg, the long leg being longer than the short leg, and wherein a first end of the long leg is coupled to an inner surface of the enclosure and extending inwards relative to the enclosure and the short leg is coupled to a second end of the long leg inwards of the first end of the long leg and extending inwards relative to the enclosure.

18. The airflow system of claim 17, wherein:
- one side of the long leg is configured to reflect sound and an other side of the long leg including a sound absorptive material; and
- the short leg includes two sides each including a sound absorptive material.

19. The airflow system of claim 17, wherein:

the plurality of louvers includes a first louver and a second louver below the first louver, each of the first louver and the second louver comprising a short leg and a long leg longer than the short leg; and a first vertical length between a highest point of the short leg of the first louver and a lowest point of the short leg of the first louver is greater than a second vertical length between a highest point of the short leg of the first louver and a highest point of the short leg of the second louver.

20. The airflow system of claim 17, wherein a side of each of the plurality of louvers facing the second path comprises a sound-absorptive material.

* * * * *